(12) United States Patent
Tsirkin et al.

(10) Patent No.: US 10,409,633 B2
(45) Date of Patent: Sep. 10, 2019

(54) HYPERVISOR-VISIBLE GUEST THREAD MANAGEMENT

(71) Applicant: Red Hat Israel, Ltd., Raanana (IL)

(72) Inventors: Michael Tsirkin, Lexington, MA (US); Amnon Ilan, Katzir (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/985,482

(22) Filed: May 21, 2018

(65) Prior Publication Data

US 2018/0267825 A1 Sep. 20, 2018

Related U.S. Application Data

(63) Continuation of application No. 15/162,579, filed on May 23, 2016, now Pat. No. 9,977,690.

(51) Int. Cl.
*G06F 9/455* (2018.01)
(52) U.S. Cl.
CPC ...... *G06F 9/45558* (2013.01); *G06F 9/45541* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| 8,171,488 | B1 | 5/2012 | Waldspurger et al. |
| 8,539,499 | B1 | 9/2013 | Tovpeko et al. |
| 8,701,115 | B2 | 4/2014 | Bhandari et al. |
| 8,752,058 | B1 | 6/2014 | Zheng et al. |
| 9,164,809 | B2 | 10/2015 | Tsirkin et al. |
| 9,183,030 | B2 | 11/2015 | Nicholas et al. |
| 9,244,732 | B2 | 1/2016 | West et al. |
| 2014/0331222 | A1 | 11/2014 | Zheng |

OTHER PUBLICATIONS

Wahl, "Hyper-Threading Gotcha with Virtual Machine vCPU Sizing," <wahlnetwork.com/2013/09/30/hyper-threading-gotcha-virtual-machine-vcpu-sizing/>, published on Sep. 30, 2013, 9 pages, General Tech, Creative Commons Attribution.

Miao et al., "FlexCore: Dynamic Virtual Machine Scheduling Using VCPU Ballooning," <ieeexplore.ieee.org/stamp/stamp.jsp?arnumber=7040515>, Tsinghua Science and Technology, published in Feb. 2015, 10 pages, vol. 20, No. 1, Institute of Parallel and Distributed System (IPADS), the School of Software, Shanghai Jiao Tong University, Shanghai 200240, China.

(Continued)

*Primary Examiner* — Gregory A Kessler
(74) *Attorney, Agent, or Firm* — Lowenstein Sandler LLP

(57) ABSTRACT

Responsive to receiving a first request from an application to create a thread for the application, a guest operating system sends a first notification to a hypervisor to create a dedicated virtual processor for the thread. Responsive to receiving an identifier associated with the dedicated virtual processor from the hypervisor, the guest operating system starts the thread using the dedicated virtual processor, and pins the thread to the dedicated virtual processor.

20 Claims, 6 Drawing Sheets

(56) References Cited

OTHER PUBLICATIONS

Song et al., "Schedule Processes, not VCPUs," <ipads.se.sjtu.edu.cn/_media/publications/vcpu-bal-apsys13>, Institute of Parallel and Distributed Systems School of Software, Shanghai Jiao Tong University, published on Jul. 29-30, 2013, Singapore, Singapore.

"Virtualized CPU Cores vs. Threads," <serverfault.com/questions/132441/virtualized-cpu-cores-vs-threads>, downloaded on Feb. 26, 2016, 2 pages.

VMware, "The CPU Scheduler in VMware vSphere® 5.1," <vmware.com/files/pdf/techpaper/VMware-vSphere-CPU-Sched-Perf>, Performance Study, Technical Whitepaper, 26 pages, Palo Alto, CA, USA.

HYPERVISOR-VISIBLE GUEST THREAD MANAGEMENT

CROSS REFERENCE TO RELATED APPLICATION

This continuation application claims priority to U.S. patent application Ser. No. 15/162,579 filed on May 23, 2016, which is hereby incorporated by reference herein.

TECHNICAL FIELD

The present disclosure is generally related to computer systems, and more particularly, to thread management in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest."

A virtual machine may comprise one or more "virtual processors" (VCPUs), each of which maps, possibly in a many-to-one fashion, to a central processing unit (CPU) of the host machine. The hypervisor can manage these mappings in a transparent fashion, thereby enabling the guest operating system and applications executing on the virtual machine to interact with the virtual processors as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
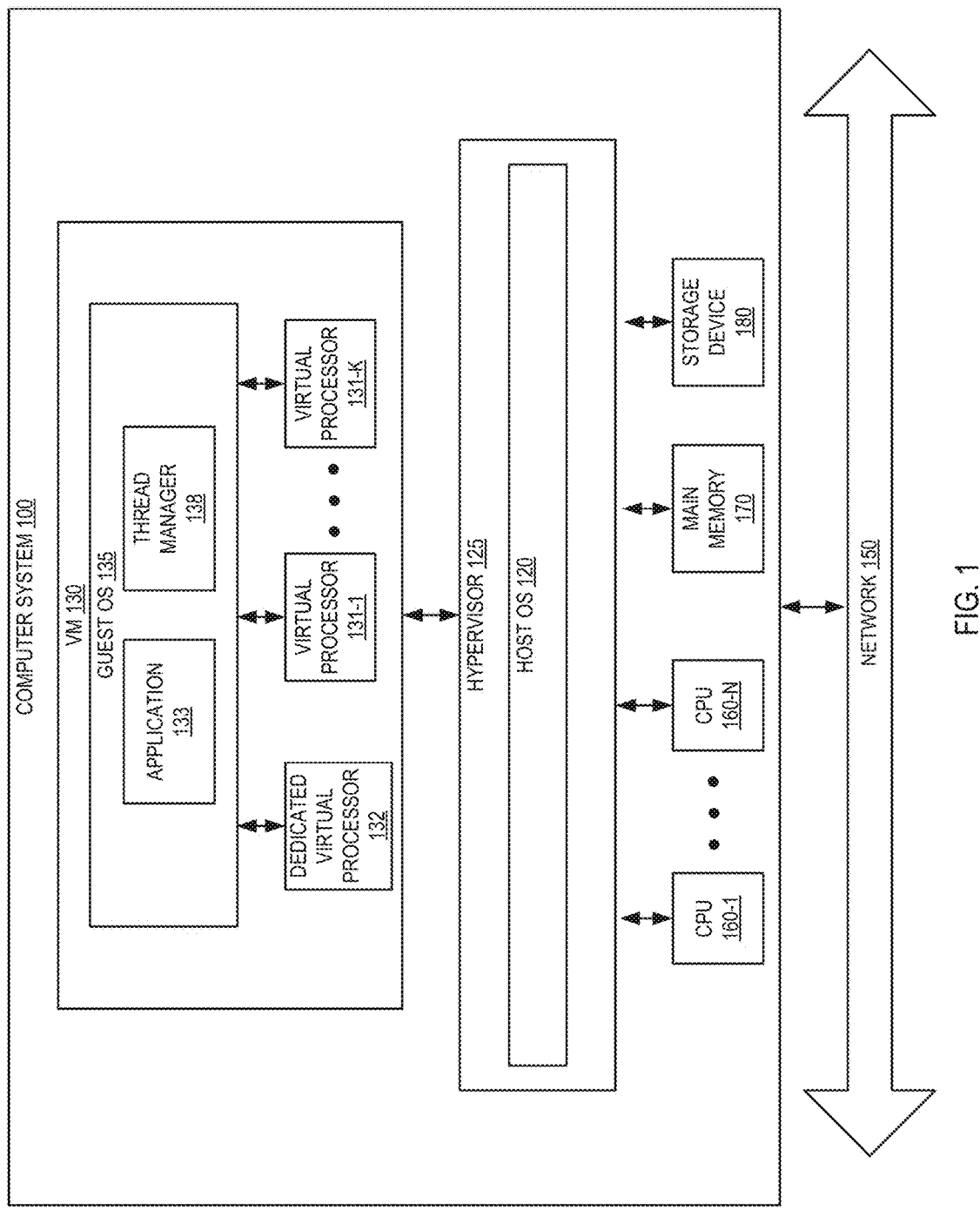
FIG. 1 depicts a high-level component diagram of an example computer system architecture, in accordance with one or more aspects of the present disclosure.

Described herein are methods and systems for hypervisor-visible guest thread management. In virtualized systems, network node functions can be implemented in a virtual machine, which is commonly referred to as network function virtualization (NFV). NFV implementations can include virtualized network controllers, load balancers, firewalls, network address translation devices, intrusion detection devices, domain name service (DSN) managers, or the like. Typically, NFV applications can involve advanced configuration of hardware queues for the associated guest operating system, as well as dedicated virtual processors for each application thread in order to optimize performance. This, however, can involve rigid pre-configuration of the VM for the NFV application that ties resources to specific applications, which can have a negative effect on performance of the VM overall, and also lead to a network function component that cannot respond efficiently to changes in load.

Moreover, the host scheduler typically has no visibility into application threads running within the guest operating system. A guest scheduler can move threads between virtual processors, and a host scheduler can move virtual processors between physical processors. The two schedulers are not typically aware of each other, which can lead to scheduling conflicts. For example, a guest scheduler may detect that a virtual processor is idle, and subsequently assign additional threads to that virtual processor. At the same time, the host scheduler may detect that the virtual processor is idle and move the virtual processor to a different physical processor which may now have fewer resources available to handle the additional threads that have been assigned by the guest operating system.

Aspects of the present disclosure address the above noted and other deficiencies by implementing hypervisor-visible guest thread management. A dedicated virtual processor (VCPU) can be created for an application dynamically at its current time of need (e.g., the dedicated VCPU can be created for the application thread at the time the application thread is started), rather than by requiring configuration that permanently creates a VCPU at VM startup. Additionally, the dedicated VCPU can be released once the associated thread is terminated, thereby returning resources to the guest OS for other uses. Moreover, by dedicating a VCPU to a thread for the duration of the thread, and then releasing the VCPU back to the operating system, the host scheduler can obtain full visibility with the guest scheduler, reducing scheduler conflicts between the guest OS and the host. Thus, application thread performance can be managed more efficiently and reliably.

In an illustrative example, responsive to receiving a request from an application to create a thread for the application, a guest operating system of a virtual machine can send a notification to a hypervisor to create a dedicated virtual processor for the thread. Responsive to receiving an identifier associated with the dedicated virtual processor from the hypervisor, the guest operating system can start the thread using the dedicated virtual processor, and pin the thread to the dedicated virtual processor. Responsive to receiving a second request from the application to terminate the thread, the guest operating system can unpin the thread from the dedicated virtual processor and send a second notification to the hypervisor to remove the dedicated processor from the guest operating system.

FIG. 1 depicts a high-level component diagram of an illustrative example of a computer system 100, in accordance with one or more aspects of the present disclosure. Other architectures for computer system 100 are possible, and implementation of a computer system utilizing examples of the present disclosure is not limited to the specific architecture depicted by FIG. 1.

As shown in FIG. 1, the computer system 100 is connected to a network 150 and comprises one or more central processing units (CPU) 160-1 through 160-N, where N is a positive integer, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160-1 through 160-N. It should be noted that although, for simplicity, a single CPU 160, storage device 180, and device 190 are depicted in FIG. 1, other implementations of computer system 100 may comprise a plurality of CPUs, storage devices, and devices.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise a virtual machine (VM) 130 and hypervisor 125. VM 130 may be an application environment that executes programs as though it was an actual physical machine. Hypervisor 125 may provide a virtual operating platform for VMs 130 and manage their execution. In some implementations, Hypervisor 125 may include a component (sometimes called a host operating system (OS) 120) that manages the hardware resources of the computer system and provides functions such as inter-process communication, scheduling, memory management, and so forth. It should be noted that in some alternative implementations, hypervisor 125 may be embedded within host OS 120, rather than host OS 120 being embedded within hypervisor 125, or may replace host OS 120.

VM 130 may comprise a guest operating system (OS) 135, virtual processors 131-1 through 131-N, where N is a positive integer, and dedicated virtual processor 132. Guest OS 135 may handle the execution of applications 133 within the virtual machine. Virtual processors 131-1 through 131-K may be used by guest OS 135 to handle the execution of application threads associated with applications 133, as well as for guest OS functions within the virtual machine. Dedicated virtual processor 132 may be used to handle the execution of a particular application thread associated with applications 133, as described herein. An application thread may be the smallest sequence of programmed instructions that can be managed independently by the guest OS 135 scheduler. An application thread can be a component of a process executing within guest OS 135. Multiple threads associated with a single process can execute concurrently, sharing system resources (e.g., memory), and can share instructions and execution state at any given period of time during execution.

It should be noted that although, for simplicity, a single VM 130 is depicted in FIG. 1, computer system 100 may host a plurality of VMs 130.

Each virtual processor 131 and dedicated virtual processor 132 is a component that emulates a physical processor, and that maps to one of central processing units (CPU) 160, possibly in a many-to-one fashion. It should be noted that the number of virtual processors may or may not be the same as the number of CPUs (i.e., K may or may not equal N). In some implementations, hypervisor 125 manages these mappings in a transparent fashion, so that guest OS 135 and applications 133 executing on virtual machine 130 interact with virtual processors 131 and dedicated virtual processors 132 as though they were actual physical processors.

Thread manager 138 can implement hypervisor-visible guest thread management by facilitating the ability of the guest OS 135 to pin a dedicated virtual processor 132 to an application thread for application 133. In an illustrative example, thread manager 138 can receive a request from application 133 to create a thread for the application. In some implementations, application 133 may be a web server, a database server, a file system, or any other similar application that executes within the guest OS 135. In some implementations, application 133 may be a network function virtualization (NFV) application that virtualizes a class of network node functions to create communication services. For example, an NFV application may provide the functionality of a network controller, a load balancer, a firewall, an intrusion detection device, a performance monitor, or the like. The request may be received from application 133 via a system call, an application program interface (API) call, by accessing a queue of requests in a shared memory space, or in any other manner.

Responsive to receiving the request from application 133, thread manager 138 can determine that a dedicated virtual processor 132 is to be associated with the thread. Thread manager 138 may make this determination by determining that application 133 has an execution authority level that grants application 133 access to a dedicated virtual processor 133 in view of a permission associated with the application. In some implementations, the permission attribute may be a value of a portion of an executable binary component of the application 133. For example, thread manager 138 may examine a specific offset of the executable component of application 133, and if the contents at that offset are equal to a particular value (or a particular range of values), then thread manager 138 may determine that application 133 has the execution authority to access a dedicated virtual processor 132 for the requested application thread.

In some implementations, the permission attribute may be an entry in a mapping table (not pictured) that associates application 133 with an execution authority level that grants application 133 access to a dedicated virtual processor 132 for its application threads. The mapping table entry may include a unique identifier that identifies an authorized application 133. For example, the mapping table may include the application name, an application license serial number, a process id for executing the application within the guest OS 135, or the like. The mapping table may also include the permission attribute that indicates whether application 133 has the requisite execution authority level that grants application 133 access to a dedicated virtual processor 132. In such implementations, the permission attribute in the mapping table may be alphanumeric (e.g., 'Y', 'N', "YES", "NO", etc.), numeric ('0', '1', etc.), Boolean (e.g., true, false), or the like.

Thread manager 138 may also determine that a dedicated virtual processor 132 is to be associated with the application thread by determining that the request from application 133 to create the thread includes an indicator specifying that the requested thread is to be associated with a dedicated virtual processor 132. Notably, the request from application 133 may not include a reference to a specific dedicated virtual processor 132 (e.g., a Logical Advanced Programmable Interrupt Controller (LAPIC) identifier that maps to a particular virtual processor), but may rather indicate that a dedicated virtual processor is to be associated with the thread. For example, application 133 may send an indicator to thread manager 138 as a part of the operating system call executed by application 133 to request that thread manager 138 create the application thread. The indicator may be alphanumeric (e.g., 'Y', 'N', "YES", "NO", etc.), numeric ('0', '1', etc.), Boolean (e.g., true, false), or the like.

Thread manager 138 may also determine that a dedicated virtual processor 132 is to be associated with the application thread by receiving a separate request from application 133 that includes a separate notification to associate the thread with a dedicated virtual processor. In some implementations, this additional request may be sent to thread manager 138 from application 133 prior to creating the thread. For example, application 133 may send an initial request to thread manager 138 to notify thread manager 138 that any subsequent thread requests from application 133 are to be associated with a dedicated virtual processor. At a later time, application 133 may then send another request to thread manager 138 that notifies thread manager 138 that any subsequent thread requests should not be associated with a dedicated virtual processor. Thus, the association of a dedicated virtual processor with an application thread may be managed dynamically by an application.

Once thread manager 138 determines that a dedicated virtual processor is to be associated with the requested application thread, thread manager 138 may then send a notification to hypervisor 125 to create a dedicated virtual processor for the thread. In some implementations, the notification may specify a particular virtual non-uniform memory access (NUMA) node for the dedicated virtual processor, or, more generally, may specify a particular group of processors (e.g., a proximity domain) for the dedicated virtual processor. The notification may be sent to hypervisor 125 by using a hypercall, by using a privileged instruction causing a VM control transfer (e.g., a VM exit) to hypervisor 125, by using an interrupt, by storing a request in a shared memory space accessible to the hypervisor, or in any other manner.

Thread manager 138 may then receive a response from hypervisor 125. In some implementations, the response may include an indication of whether the request was denied or granted. If granted, the response may also include an identifier associated with the dedicated virtual processor. The identifier may be a unique identifier used by the hypervisor to identify the specific dedicated virtual processor among all virtual processors in a given VM managed by hypervisor 125 (e.g., a LAPIC identifier). Thread manager 138 may then start the application thread using the dedicated virtual processor received from the hypervisor. Thread manager 138 may start the thread by using the identifier received from the hypervisor.

Thread manager 138 may subsequently pin the thread to the dedicated virtual processor using the identifier received from the hypervisor. Pinning enables the binding of a thread to a virtual processor so that the thread can execute solely on that designated processor rather than any other processor. Additionally, the binding limits the virtual processor to executing the pinned thread rather than any other thread. Thus, the application thread should execute on the dedicated virtual processor 132 rather than any virtual processors 131-A through 131-K. In some implementations, thread manager 138 may pin the thread to the dedicated virtual processor by creating a data structure in memory accessible by the guest operating system that associates the thread with the dedicated virtual processor. The data structure may store information for all virtual processors and application threads associated with the guest operating system. Alternatively, the data structure may store information for a single virtual processor and associated application thread. Thread manager 138 may pin the thread by creating a record in a table, adding an item to a linked list, creating a data object, or in any similar manner. The data structure can be used by the guest operating system when selecting a virtual processor to run on an available processor, when selecting a virtual processor to assign to a waiting thread, or the like. Responsive to detecting the data structure, if the pinned thread is idle, the guest operating system can halt the virtual processor even if there are other threads waiting to execute. Similarly, the guest operating system should not assign the thread to run on a second virtual processor even if the second virtual processor is otherwise idle.

Once the application thread has completed, thread manager 138 may receive a request from application 133 to terminate the thread. The request may be received from application 133 via a system call, an application program interface (API) call, by accessing a queue of requests in a shared memory space, or in any other manner. Thread manager 138 may unpin the application thread from the dedicated virtual processor 132. Unpinning the thread removes the binding to the dedicated virtual processor. In some implementations, thread manager 138 may unpin the thread from the dedicated virtual processor by deleting the data structure described above. Thread manager 138 may use the identifier associated with the dedicated virtual processor 132 to identify the dedicated virtual processor associated with the application thread to unpin the thread. Thread manager 138 may then terminate execution of the thread. In some implementations, thread manager 138 may combine the unpinning with thread termination by destroying the thread in a single step.

Subsequently, thread manager 138 may send a second notification to hypervisor 125 to remove the dedicated virtual processor 132 from the guest OS 135. The notification may be sent to hypervisor 125 by using a system call, by using an application program interface (API) call, by using an interrupt, by storing a request in a shared memory space accessible to the hypervisor, or in any other manner.

Figure 2A:
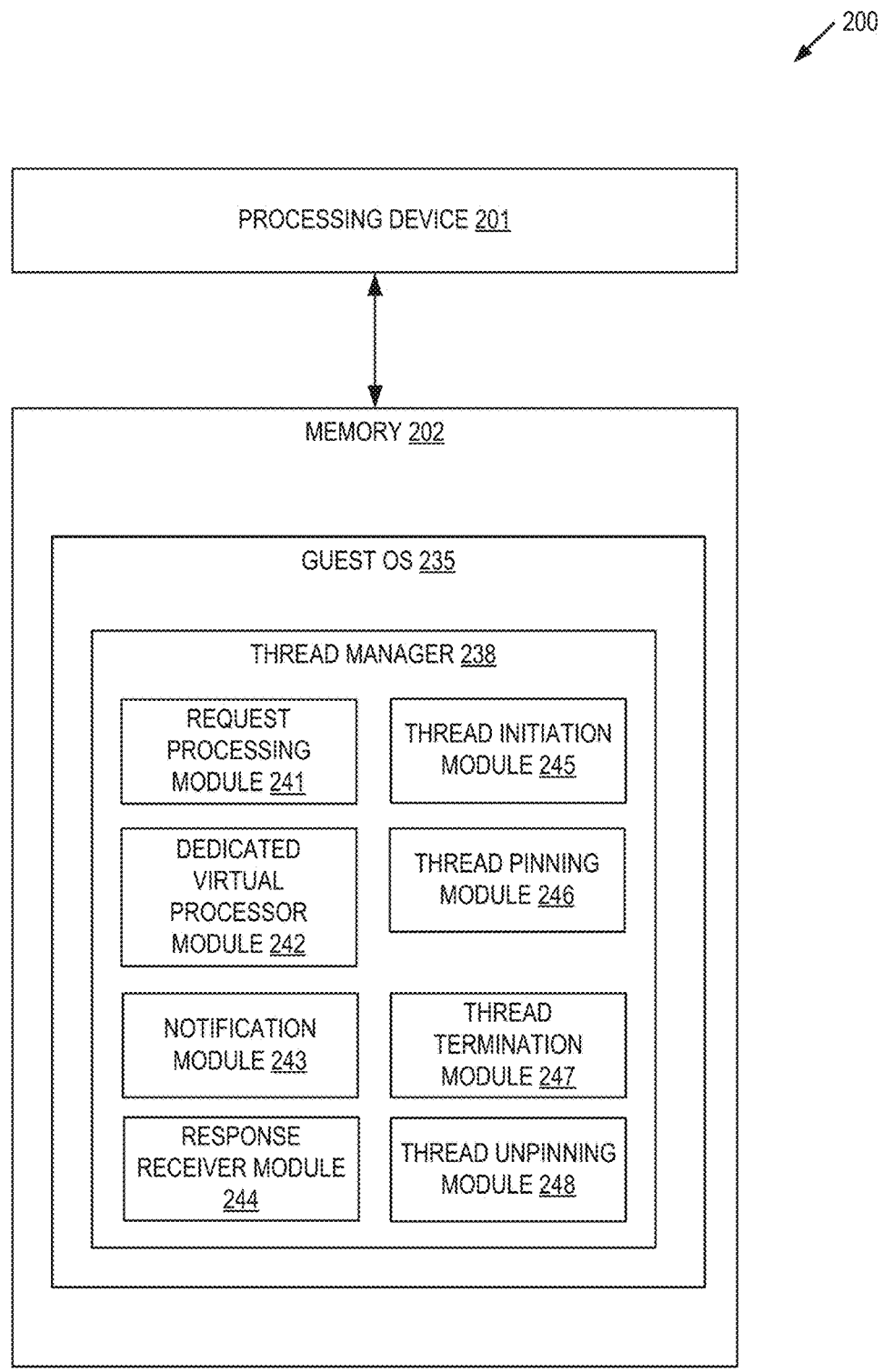
FIG. 2A depicts a block diagram illustrating an example of a thread manager for facilitating hypervisor visible guest thread management, in accordance with one or more aspects of the present disclosure.

FIG. 2A depicts a block diagram illustrating an example a thread manager 238 for facilitating hypervisor visible guest thread management. In some implementations, thread manager 238 may correspond to thread manager 138 of FIG. 1 and/or thread manager 238 of FIG. 2B. As shown in FIG. 2A, thread manager 238 may be a component of a computing apparatus 200 that includes a processing device 201, operatively coupled to a memory 202, to execute a guest OS 235. In some implementations guest OS 235 may correspond to guest OS 135 of FIG. 1 and/or guest OS 235 of FIG. 2B. In some implementations, processing device 201 and memory 202 may correspond to processing device 502 and main memory 504 respectively as described below with respect to FIG. 5.

Thread manager 238 may include request processing module 241, dedicated virtual processor module 242, notification module 243, response receiver module 244, thread initiation module 245, thread pinning module 246, thread termination module 247, and thread unpinning module 248. Alternatively, the functionality of one or more of request processing module 241, dedicated virtual processor module 242, notification module 243, response receiver module 244, thread initiation module 245, thread pinning module 246, thread termination module 247, and thread unpinning module 248 may be combined into a single module or divided into multiple sub-modules.

Request processing module 241 is responsible for receiving a request from an application to create a thread for the application. In some implementations, the application may be a web server, a database server, a file system, or any other similar application that executes within a guest OS. In some implementations, the application may be a network function virtualization (NFV) application that virtualizes a class of network node functions to create communication services.

Dedicated virtual processor module 242 is responsible for determining whether a virtual processor is to be associated with the thread. Dedicated virtual processor module 242 may make this determination by determining that the requesting application has an execution authority level that grants access to a dedicated virtual processor in view of a permission associated with the application. In some implementations, the permission attribute may be a value of a portion of an executable binary component of the application. Alternatively, the permission attribute may be an entry in a mapping table as described above with respect to FIG. 1. Dedicated virtual processor module 242 may also make this determination by determining that the request received by request processing module 241 to create the thread includes an indicator specifying that the requested thread is to be associated with a dedicate virtual processor.

Once dedicated virtual processor module 242 determines that a dedicated virtual processor is to be associated with the application thread, notification module 243 may send a notification to a hypervisor (not pictured) to create a dedicated virtual processor for the thread as described above with respect to FIG. 1. Response receiver module 244 may then receive a response from the hypervisor with information associated with the dedicated virtual processor to be assigned to the application thread. In some implementations, the response may include an indication of whether the request was denied or granted. If granted, the response may also include a unique identifier used by the hypervisor to identify the specific dedicated virtual processors among all virtual processors managed by the hypervisor (e.g., a LAPIC identifier).

Request processing module 241 may then invoke thread initiation module 245 to start the application thread using the dedicated virtual processor received from the hypervisor by response receiver module 244. Subsequently, request processing module 241 may invoke thread pinning module 246 to pin the application thread to the dedicated virtual processor using the unique identifier received from the hypervisor as described above with respect to FIG. 1.

Figure 2B:
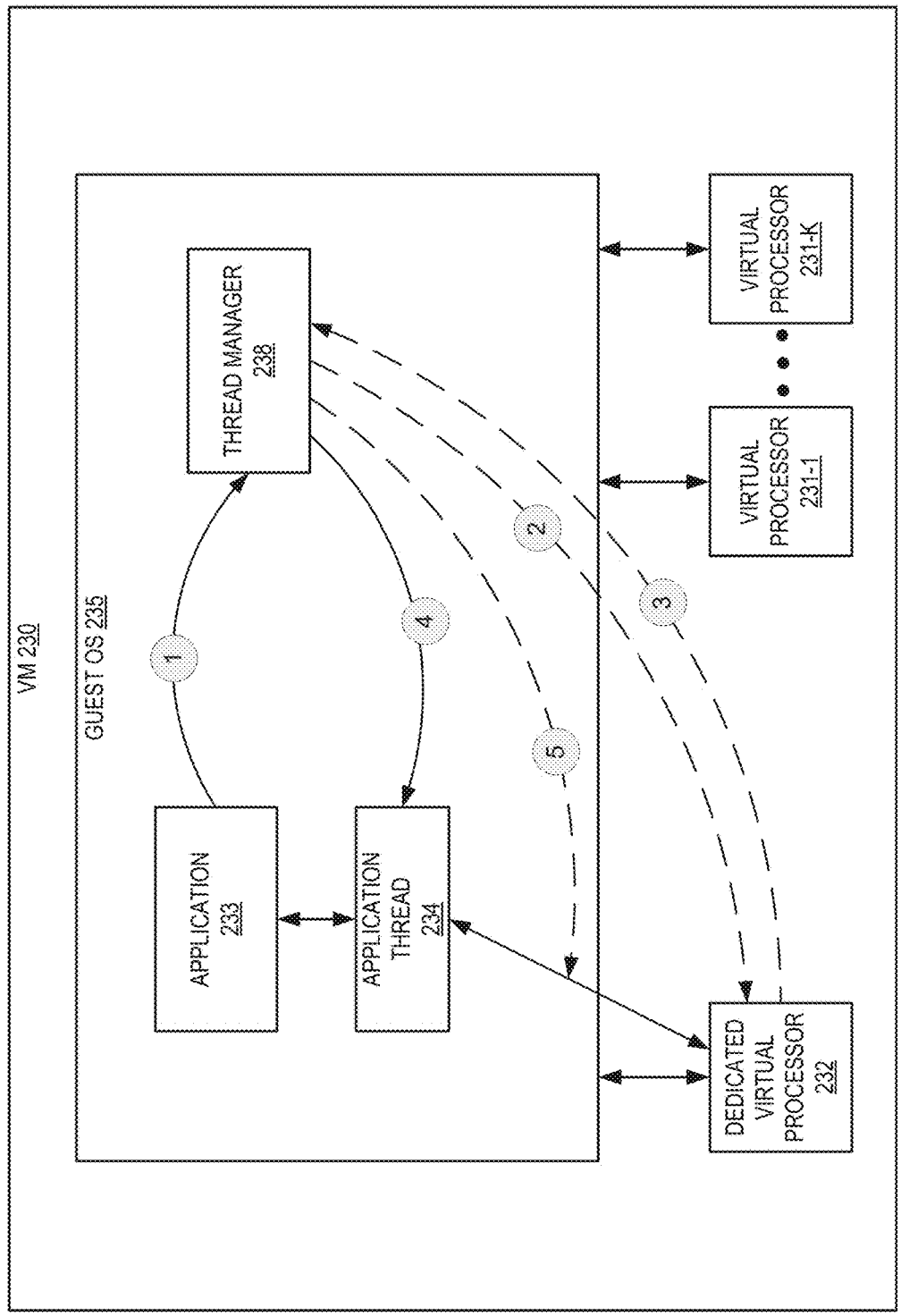
FIG. 2B depicts a block diagram illustrating an example of hypervisor visible guest thread management, in accordance with one or more aspects of the present disclosure.

Once the application thread has completed, request processing module 241 may receive a request from the application to terminate the application thread. Request processing module may then invoke thread unpinning module 238 to unpin the application thread from the dedicated virtual processor. Thread unpinning module 248 can unpin the thread by removing the binding between the application thread and the dedicated virtual processor. Request processing module 241 may subsequently invoke thread termination module 247 to terminate the thread, FIG. 2B is a block diagram illustrating an example of hypervisor visible guest thread management, in accordance with one or more implementations of the present disclosure. The thread manager 238 of guest OS 235 receives a request from an application 233 to create a thread for the application 233 (reference 1). In some implementations, thread manager 238 may correspond to the thread manager 238 of FIG. 1. Responsive to receiving the request, thread manager 238 may send a notification to a hypervisor (not pictured) to create a dedicated virtual processor 232 for the thread (reference 2). In some implementations, thread manager 238 may determine that a dedicated virtual processor 232 is to be associated with the thread as described above with respect to FIG. 1 and below with respect to FIG. 3.

Subsequently, thread manager 238 may receive a response from the hypervisor that includes an identifier associated with dedicated virtual processor 232 (reference 3). The identifier may be a unique identifier used by the hypervisor to identify the specific dedicated virtual processor 232 among all virtual processors managed by hypervisor (e.g., a LAPIC identifier). Responsive to receiving the identifier from the hypervisor, thread manager 238 may then start application thread 234 for application 233 (reference 4) using the identifier received from the hypervisor so that thread 234 executes using dedicated virtual processor 232. Thread manager 238 may then pin application thread 234 to dedicated virtual processor 232 using the identifier received from the hypervisor so that thread 234 should execute on the dedicated virtual processor 232 and not any virtual processors 231-A through 231-K (reference 5).

Figure 3:
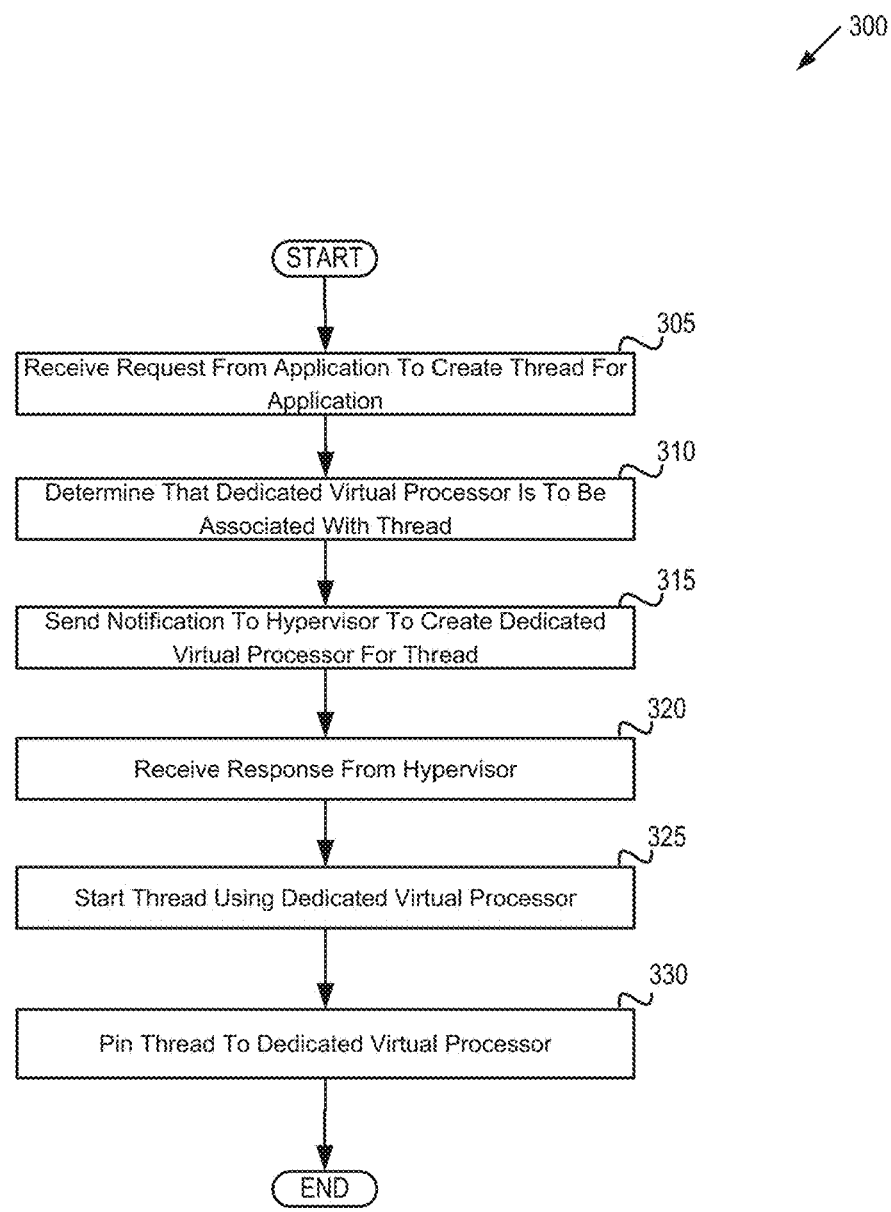
FIG. 3 depicts a flow diagram of a method for pinning a dedicated virtual processor to an application thread, in accordance with one or more aspects of the present disclosure.

FIG. 3 depicts a flow diagram of an example method 300 for pinning a dedicated virtual processor to an application thread. The method may be performed by processing logic that may comprise hardware (circuitry, dedicated logic, etc.), computer readable instructions (run on a general purpose computer system or a dedicated machine), or a combination of both. In one illustrative example, method 300 may be performed by thread manager 138 of guest OS 135 in FIG. 1. Alternatively, some or all of method 300 might be performed by another module or machine. It should be noted that blocks depicted in FIG. 3 could be performed simultaneously or in a different order than that depicted.

At block 305, processing logic receives a first request from an application to create a thread for the application. In some implementations, the application may be a web server, a database server, a file system, or any other similar application that executes within a guest OS. In some implementations, the application may be a network function virtualization (NFV) application that virtualizes a class of network node functions to create communication services. For example, an NFV application may provide the functionality of a network controller, a load balancer, a firewall, an intrusion detection device, a performance monitor, or the like. The request may be received from the application via a system call, an application program interface (API) call, by accessing a queue of requests in a shared memory space, or in any other manner.

At block 310, processing logic determines that a dedicated virtual processor is to be associated with the thread. Processing logic may make this determination as described in further detail above with respect to thread manager 138 of FIG. 1. At block 315, processing logic sends a first notification to a hypervisor to create the dedicated virtual processor for the thread. In some implementations, the notification may specify a particular virtual non-uniform memory access (NUMA) node for the dedicated virtual processor, or may specify a particular group of processors (e.g., a proximity domain) for the dedicated virtual processor. The notification may be sent to the hypervisor by using a system call, by using an application program interface (API) call, by using an interrupt, by storing a request in a shared memory space accessible to the hypervisor, or in any other manner.

At block 320, processing logic receives a response from the hypervisor. In some implementations, the response includes an identifier associated with the dedicated virtual processor. In some implementations, the request may include an indication of whether the request was denied or granted. If granted, the response may also include an identifier associated with the dedicated virtual processor. The identifier may be a unique identifier used by the hypervisor to identify the specific dedicated virtual processor among all virtual processors managed by hypervisor (e.g., a LAPIC identifier).

At block 325, processing logic starts the thread using the dedicated virtual processor. In some implementations, processing logic may start the thread using the identifier received from the hypervisor at block 320. At block 330, processing logic pins the thread to the dedicated virtual processor using the identifier received from the hypervisor at block 320. After block 330, the method of FIG. 3 terminates.

Figure 4:
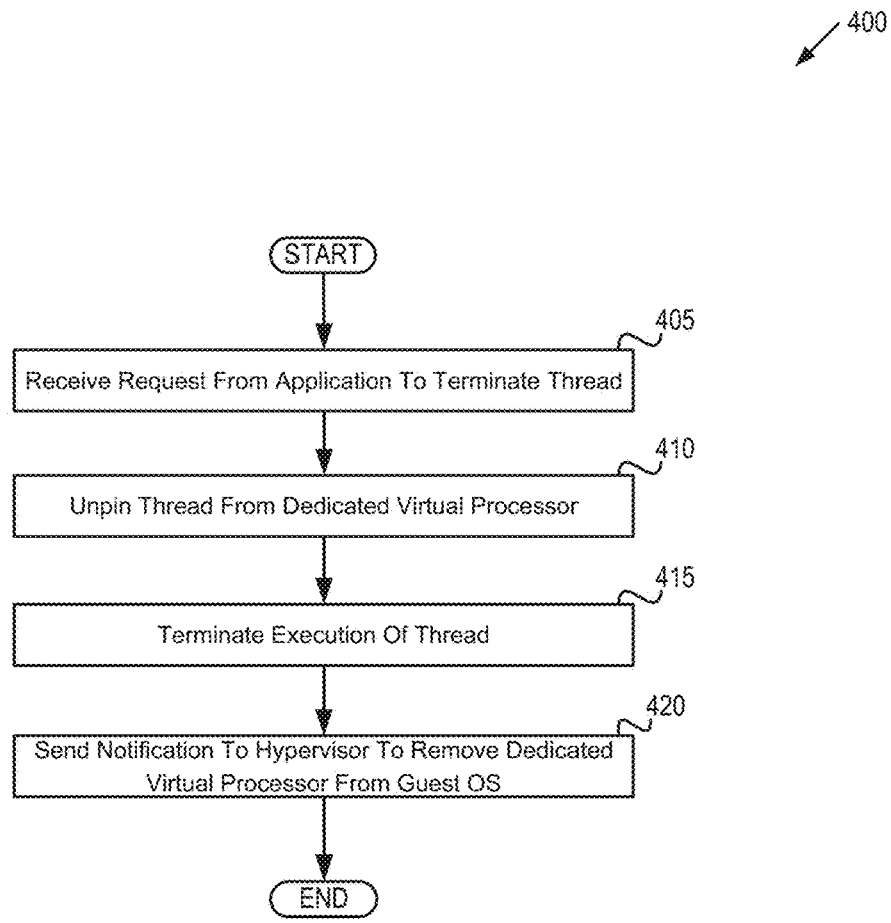
FIG. 4 depicts a flow diagram of a method for unpinning a dedicated virtual processor from an application thread, in accordance with one or more aspects of the present disclosure.

FIG. 4 depicts a flow diagram of an example method 400 for unpinning a dedicated virtual processor from an application thread. The method may be performed by processing logic that may comprise hardware (circuitry, dedicated logic, etc.), computer readable instructions (run on a general purpose computer system or a dedicated machine), or a combination of both. In one illustrative example, method 400 may be performed by thread manager 138 of guest OS 135 in FIG. 1. Alternatively, some or all of method 400 might be performed by another module or machine. It should be noted that blocks depicted in FIG. 4 could be performed simultaneously or in a different order than that depicted.

At block 405, processing logic receives a second request from the application to terminate the thread. The request may be received from the application via a system call, an application program interface (API) call, by accessing a queue of requests in a shared memory space, or in any other manner. At block 410, processing logic unpins the thread from the dedicated virtual processor. In some implementations, processing logic uses the identifier for the dedicated virtual processor received from the hypervisor (e.g., for example the identifier received at block 320 of FIG. 3) to unpin the thread. At block 415, processing logic terminates execution of the thread. In some implementations of method 400, blocks 410 and 415 may be performed in a single step so that termination of the thread performs the unpinning operation.

At block 420, processing logic sends a second notification to the hypervisor to remove the dedicated virtual processor from the guest operating system. In some implementations, the notification includes the identifier received from the hypervisor for the dedicated virtual processor (e.g., for example the identifier received at block 320 of FIG. 3). The notification may be sent to the hypervisor by using a system call, by using an application programmer interface (API) call, by using an interrupt, by storing a request in a shared memory space accessible to the hypervisor, or in any other manner. After block 420, the method of FIG. 4 terminates.

Figure 5:
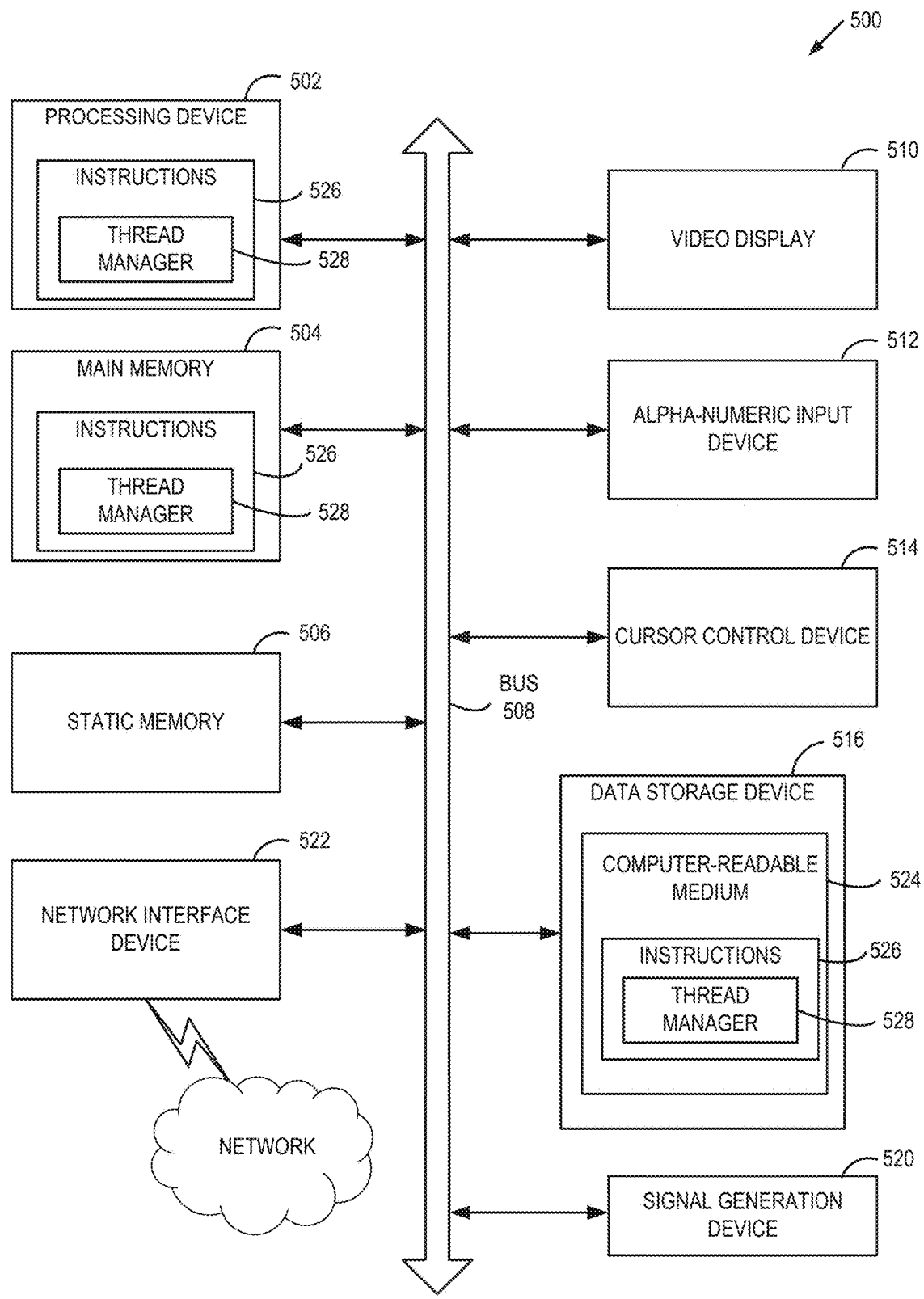
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes thread manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include thread manager 528 (e.g., corresponding to the methods of FIGS. 3-4, etc.) embodying any one or more of the methodologies or functions described herein. Thread manager 528 may also reside, completely or at least partially, within the main memory 504 and/or within the processing device 502 during execution thereof by the computer system 500, the main memory 504 and the processing device 502 also constituting computer-readable media. Thread manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "sending," "starting," "pinning," "unpinning," "terminating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device executing a guest operating system managed by a hypervisor, a request to terminate a thread associated with a virtual processor;
   terminating, by the guest operating system, the thread; and
   sending, by the guest operating system, a notification to the hypervisor to disassociate the virtual processor from the guest operating system.

2. The method of claim 1, wherein the virtual processor is dedicated to the thread.

3. The method of claim 1, wherein the virtual processor is associated with a unique identifier.

4. The method of claim 3, wherein the notification to the hypervisor to disassociate the virtual processor from the guest operating system comprises the unique identifier associated with the virtual processor.

5. The method of claim 1, wherein sending the notification to the hypervisor to disassociate the virtual processor from the guest operating system comprises storing the notification in a shared memory space accessible by the hypervisor.

6. The method of claim 1, wherein an association between the thread and the virtual processor was established by the guest operating system.

7. The method of claim 6, further comprising:
prior to terminating the thread, disassociating, by the guest operating system, the thread from the virtual processor.

8. A system comprising:
a memory; and
a processing device, operatively coupled to the memory, to execute a guest operating system of a virtual machine managed by a hypervisor to:
receive a request to terminate a thread associated with a virtual processor;
terminate the thread; and
send a notification to the hypervisor to disassociate the virtual processor from the guest operating system.

9. The system of claim 8, wherein the virtual processor is dedicated to the thread.

10. The system of claim 8, wherein the virtual processor is associated with an identifier that identifies the virtual processor from a plurality of virtual processors managed by the hypervisor.

11. The system of claim 10, wherein the notification to the hypervisor to disassociate the virtual processor from the guest operating system comprises the identifier.

12. The system of claim 8, wherein to send the notification to the hypervisor to disassociate the virtual processor from the guest operating system, the processing device is to store the notification in a shared memory space accessible by the hypervisor.

13. The system of claim 8, wherein association between the thread and the virtual processor was established by the guest operating system pinning the thread to the virtual processor.

14. The system of claim 13, wherein the processing device is further to:
prior to terminating the thread, unpin, using the guest operating system, the thread from the virtual processor.

15. A non-transitory computer readable medium, having instructions stored therein, which when executed by a processing device of a computer system, cause the processing device to:
receive a request to terminate a thread associated with a virtual processor, wherein the processing device executes a guest operating system managed by a hypervisor;
terminate the thread; and
send a notification to the hypervisor to disassociate the virtual processor from the guest operating system.

16. The non-transitory computer readable storage medium of claim 15, wherein the virtual processor is associated with an identifier that identifies the virtual processor from a plurality of virtual processors managed by the hypervisor.

17. The non-transitory computer readable storage medium of claim 16, wherein the notification to the hypervisor to disassociate the virtual processor from the guest operating system comprises the identifier.

18. The non-transitory computer readable storage medium of claim 15, wherein to send the notification to the hypervisor to disassociate the virtual processor from the guest operating system, the processing device is to store the notification in a shared memory space accessible by the hypervisor.

19. The non-transitory computer readable storage medium of claim 15, wherein association between the thread and the virtual processor was established by the guest operating system pinning the thread to the virtual processor.

20. The non-transitory computer readable storage medium of claim 19, wherein the processing device is further to:
prior to terminating the thread, unpin, using the guest operating system, the thread from the virtual processor.

* * * * *